(No Model.) 2 Sheets—Sheet 1.

A. BLATCHLY.
SEWER GAS TRAP.

No. 276,217. Patented Apr. 24, 1883.

Witnesses,
Geo. H. Strong.
L. H. Nomse

Inventor,
A. Blatchly
By Dewey & Co.
Attorneys (No Model.) 2 Sheets—Sheet 2.

A. BLATCHLY.
SEWER GAS TRAP.

No. 276,217. Patented Apr. 24, 1883.

Witnesses,
Geo. H. Strong.
L. H. Foure

Inventor,
A. Blatchly
By Dewey & Co
Attorney

UNITED STATES PATENT OFFICE.

AMBROSE BLATCHLY, OF SAN FRANCISCO, CALIFORNIA.

SEWER-GAS TRAP.

SPECIFICATION forming part of Letters Patent No. 276,217, dated April 24, 1883.

Application filed July 25, 1882. (No model.)

*To all whom it may concern:*

Be it known that I, AMBROSE BLATCHLY, of the city and county of San Francisco, State of California, have invented an Improved Sewer-Gas Trap; and I hereby declare the following to be a full, clear, and exact description thereof.

My invention relates to an improved trap for the arrest of sewer-gas; and it consists of a peculiarly-shaped chamber, in the bottom of which mercury is placed, so that a complete metallic gate or trap is formed to prevent the passage of gas. The chamber is made of glass or other transparent material to permit an inspection of its contents, and is of such a shape that the level of the mercury will not be raised too high when the water is passing through the trap.

Figure 1:
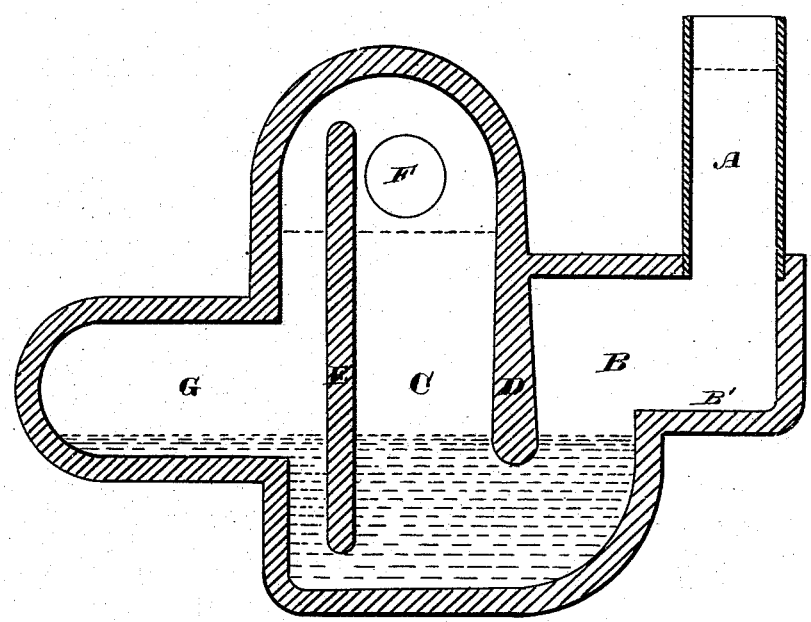
Figure 2:
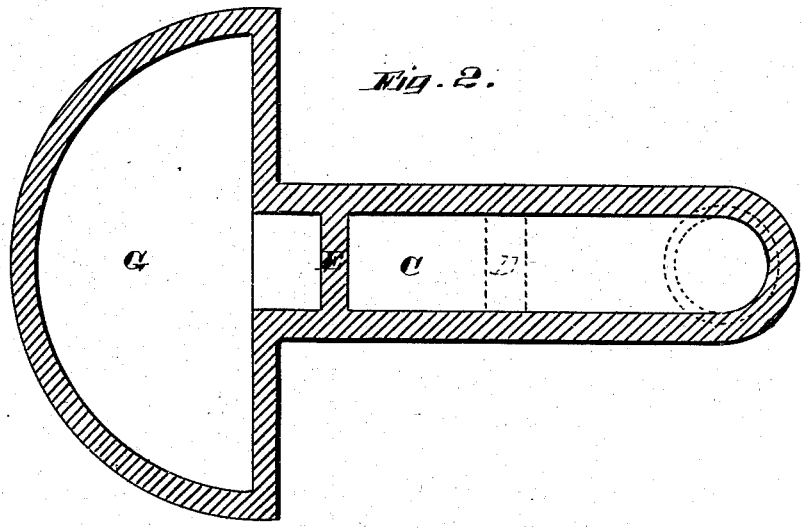
Figure 3:
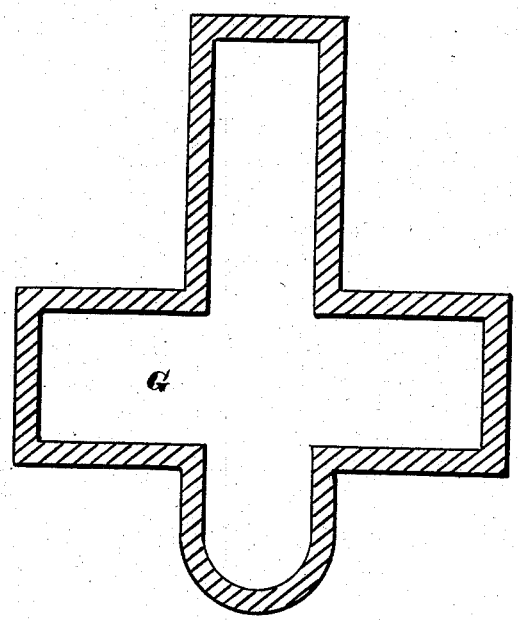
Figure 4:
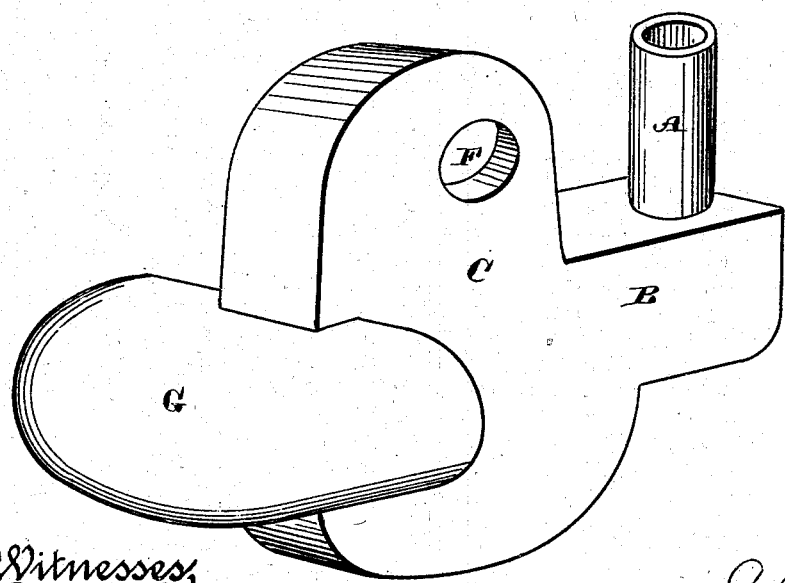

Referring to the accompanying drawings for a more complete explanation of my invention, Figure 1 is a vertical longitudinal section. Fig. 2 is a transverse section. Fig. 3 is a longitudinal section. Fig. 4 is a perspective view.

A is the pipe or passage through which water, sewage, or other matter enters the trap. Directly beneath this pipe a flat shelf, B', is formed above the level of the mercury, so that the force of the falling water shall be expended upon this portion of the trap, and it will thus be prevented from disturbing the mercury. The part C of the trap is depressed below the part B, and is filled with mercury to a point which just submerges the lower edge of the diaphragm or wall D. Within this chamber C, which extends upward to a considerable height, is another wall, E, extending transversely across from side to side. This wall does not extend to the top or bottom of the chamber, but allows the mercury to pass beneath it and the air above it. The discharge-opening F is made below the level of the top of this diaphragm, as shown. Beyond the wall E is a chamber, G, the bottom of which is below the surface of the mercury, and it is made of greater width and area than the part C, so that when water is admitted through the pipe A and passes beneath the diaphragm D it presses the mercury down at that point, thus causing it to rise in the chamber G beyond the diaphragm E. The area of this chamber is so great that the mercury spreads out and rises but little above its original level, thus presenting but little obstruction or back-pressure to the flow of water beneath the diaphragm D. As the diaphragm E has a space above and below it, the movement of the mercury and the air is unimpeded. The transparency of the material of the trap allows its contents to be inspected at any time. By this construction of the trap, and the consequent slight change in the level of the mercury, the passage of the water beneath the diaphragm D will not break the mercury up in globules or scatter it.

The operation will then be as follows: The trap is first filled with water, both in the chambers C and G, and mercury is then put in until it stands at the desired level. The water in the chamber G protects the mercury and rises and falls with it. As the discharge-opening F is below the top of the diaphragm E, no dirty water can pass over into the chamber G, but it will all escape through the usual exit-passage, F. Water is a great absorbent of sewer and other foul gases, and when the trap is simply made to contain water alone the gas will pass through it rapidly; but by using mercury, as shown, a perfect metallic stop is produced, which is impervious to gas or water.

The construction here shown produces three seals: first, the water in the chamber C; second, the mercury at the bottom; and, thirdly, the water in the chamber at B, thus presenting an insuperable barrier to the passage of any gas or noxious vapors.

Having thus described my invention, what I claim as new, and desire to secure by Letters Patent, is—

In a sewer-trap consisting of the chambers C and G, diaphragms D and E, and a body of mercury, which covers their lower edges, the shelf B', above the level of the mercury, to receive the impact of the water entering through the pipe A, substantially as herein described.

In witness whereof I hereunto set my hand.

AMBROSE BLATCHLY.

Witnesses:
S. H. NOURSE,
G. W. EMERSON.